United States Patent
Wood et al.

(10) Patent No.: US 10,587,791 B2
(45) Date of Patent: Mar. 10, 2020

(54) BLOCKING SPECIFIC AREAS OF RESTRICTED MATERIAL IN RECORDING USING VISUAL LIGHT COMMUNICATION AND IMAGE PROCESSING

(71) Applicant: International Business Machines Corporation, Armonk, NY (US)

(72) Inventors: John J. Wood, St. Albans (GB); Daniel T. Cunnington, Winchester (GB); Giacomo G. Chiarella, Eastleigh (GB); Eunjin Lee, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 16/016,787

(22) Filed: Jun. 25, 2018

(65) Prior Publication Data

US 2019/0394387 A1 Dec. 26, 2019

(51) Int. Cl.
*H04N 5/232* (2006.01)
*H04N 5/235* (2006.01)
*H04N 5/04* (2006.01)
*H04B 10/116* (2013.01)

(52) U.S. Cl.
CPC ....... *H04N 5/23206* (2013.01); *H04B 10/116* (2013.01); *H04N 5/04* (2013.01); *H04N 5/2353* (2013.01)

(58) Field of Classification Search
CPC .... H04N 5/23206; H04N 5/2353; H04N 5/04; H04B 10/116
See application file for complete search history.

(56) References Cited

U.S. PATENT DOCUMENTS

| | | | |
|---|---|---|---|
| 6,256,067 B1 | 7/2001 | Yamada | |
| 6,559,883 B1 | 5/2003 | Fancher et al. | |
| 9,083,937 B1 | 7/2015 | Oliphant | |
| 9,986,290 B2* | 5/2018 | Ayers | H04N 21/4542 |
| 2004/0046871 A1 | 3/2004 | Ichikawa et al. | |
| 2010/0323608 A1 | 12/2010 | Sanhedrai et al. | |
| 2011/0279679 A1 | 11/2011 | Samuel | |
| 2015/0042819 A1 | 2/2015 | Tiscareno et al. | |
| 2015/0296170 A1 | 10/2015 | Farrell et al. | |

FOREIGN PATENT DOCUMENTS

EP 0750202 B1 5/1998

OTHER PUBLICATIONS

Devo, Jon, "How shutter speeds work when shooting video", The Videomode, <http://www.thevideomode.com/tuition/how-shutter-speeds-work-when-shooting-video-263/>, Aug. 31, 2017, 8 pages.

* cited by examiner

*Primary Examiner* — Padma Haliyur
(74) *Attorney, Agent, or Firm* — Monchai Chuaychoo (57) ABSTRACT

An approach to securing restricted materials from recording with a video recording device. The recording device synchronizes with a pulsed pattern image capture interference signal from a restricted materials protection system (RMPS) at an event venue. The recording device receives a broadcast signal from the RMPS to enable image capture for a non-restricted portion of the event venue. The recording device determines whether a recorded image contains a restricted portion of the event venue and responsive to determining that the recorded image contains the restricted portion of the event venue, disabling the recording of the restricted portion of the event venue.

17 Claims, 4 Drawing Sheets

BLOCKING SPECIFIC AREAS OF RESTRICTED MATERIAL IN RECORDING USING VISUAL LIGHT COMMUNICATION AND IMAGE PROCESSING

BACKGROUND OF THE INVENTION

The present invention relates generally to the field of protecting restricted materials from being duplicated and more particularly to protecting restricted materials from being duplicated via an image based recording device.

Protecting the copyright/restricted of visual material is important as copies can be illegally distributed and obtained by others. Currently, it is difficult to prevent users from recording visual material with a camera, augmented reality headset or mobile phone. A physical approach is often required, whereby the user is asked to stop recording or the device is confiscated from the user at a venue (e.g., concert, art gallery, etc.). Also, there are no current methods of blocking specific copyrighted/restricted material from a recording, the user can either record or not record at all. For example, if a user wants to film non-restricted material in the area (such as a confidential conference call), they will have to install a specialized software allowing them to record. The software could contains data on the frequency of the infrared or pulse pattern capture interference signal, allow the camera (on the recording device) to adjust its shutter to record without interference.

Therefore, a need for an efficient system for allowing authorize user to record and block unauthorized users from recording copyrighted materials at the same venue is required.

SUMMARY

According to an embodiments of the present invention, a method of securing restricted materials from recording with a video recording device, the method comprising; synchronizing a recording device with a pulsed pattern image capture interference signal from a restricted materials protection system (RMPS) at an event venue; receiving a broadcast signal from the RMPS to enable image capture for a non-restricted portion of the event venue; determining whether a recorded image contains a restricted portion of the event venue; and responsive to determining that the recorded image contains the restricted portion of the event venue, disabling the recording of the restricted portion of the event venue.

According to another embodiment, a computer program product for securing restricted materials from recording with a video recording device, the computer program product comprising: one or more computer readable storage devices and program instructions stored on the one or more computer readable storage devices, the stored program instructions comprising: program instructions to synchronize a recording device with a pulsed pattern image capture interference signal from a restricted materials protection system (RMPS) at an event venue; program instructions to receive a broadcast signal from the RMPS to enable image capture for a non-restricted portion of the event venue; program instructions to determine whether a recorded image contains a restricted portion of the event venue; and responsive to determining that the recorded image contains the restricted portion of the event venue, program instructions to disable the recording of the restricted portion of the event venue.

According to another embodiment, a computer system for securing restricted materials from recording with a video recording device, the computer system comprising: one or more computer processors; one or more computer readable storage devices; program instructions stored on the one or more computer readable storage devices for execution by at least one of the one or more computer processors, the stored program instructions comprising: program instructions to synchronize a recording device with a pulsed pattern image capture interference signal from a restricted materials protection system (RMPS) at an event venue; program instructions to receive a broadcast signal from the RMPS to enable image capture for a non-restricted portion of the event venue; program instructions to determine whether a recorded image contains a restricted portion of the event venue; and responsive to determining that the recorded image contains the restricted portion of the event venue, program instructions to disable the recording of the restricted portion of the event venue.

DETAILED DESCRIPTION

Embodiments of the present invention allows authorized users to record and block unauthorized users from recording restricted materials (e.g., copyright, trademark, etc.) at the same venue. It is noted that restricted materials can include non-legally protected materials that the users may deem that needs protection. For example, a user invited some friends to come view his home-made movie. However, the user does not wish to apply for copyright protection but would like to keep his friends from recording the material. A venue is a location where events (e.g., organized, impromptu, etc.) are held where users would gather. Furthermore, a venue can include a stadium, amphitheater, office meeting room, or a living room in a home. An event is an occurrence or happening. For example, an event can include a concert, a sporting match, board room meeting, or a lecture. An event venue is location that an event is occurring.

One embodiment of this invention uses a combination of dynamic image processing software and a modified VLC (Visual Light Communication) system (e.g., transmitter, receiver, processor, etc.) to identify the existence of restricted material in the vicinity of a recording taking place and to block these specific elements from being recorded but allowing recording of non-restricted materials. A VLC system is a known communication technology which uses the visible light spectrum as opposed to the radio spectrum (for Bluetooth and Wi-Fi) to transmit and receive data. However, a modified VLC system can transmit signals using the radio spectrum as well as using the visible light spectrum. It is noted that a modified VLC system instead of the traditional VLC system will be used throughout the disclosure. Embodiment of the present invention can be installed to a recording device (e.g., mobile phone, digital camera, etc.). For example, a TV monitor device displaying the restricted material will have a VLC transmitter as part of the restricted materials protection system (RMPS) on the device, which transmits a broadcast signal to nearby recording devices that the material currently being shown is restricted. The VLC transmitter may also transmit or broadcast a more detailed information (i.e., broadcast signal) associated with the restricted material such as, the dimensions, distance, spatial location coordinate (e.g., 2D and 3D) and other visual identifiers of the TV monitor (e.g., model, color, etc.). Inversely, the nearby recording devices can discern which materials are not restricted based on the signal from the RMPS and nearby recording devices can determine the location of the restricted materials relative to the location of the recording device used by the user. It is noted that the nearby recording device of the users may dynamically determine, using several well known techniques in the art, the location of the user relative to the one or more restricted materials as the user is in motion (i.e., moving around the space to record). In addition, the VLC transmitter can transmit an interference pulse signal (e.g., infrared, radio-frequency, etc.) that directly interferes or disrupts with recording functionality of the recording device when active. For example, an IR pulse can interfere with the image recording on most cameras where the shutter of the camera is not capable of blocking out the IR light. It is noted that any well known techniques of interfering with recording may be used by the VLC transmitter.

In another embodiment, the recording device may have a receiver (i.e., VLC receiver) which detects that there is restricted material near it, and also gets extra information to help identify the display screen. The recording device will then use image recognition software to identify the transmitting device in the view and selectively block that specific part of the recording view only, allowing the user to record the area with the restricted material blocked out. The image recognition software can employ several known techniques in the art since there are many different ways to identify and track an entity in a video stream. These known techniques have been employed in video capture, virtual reality and augmented reality systems. For example, devices and products that use such techniques include Microsoft™ Kinect™ and Leap Motion™. Other examples include "Sync 3D", "Asus Xtion Pro", algorithms in edge detection, or algorithms for 3D object detection in 2D video. Details of these enablement of these techniques are outside the scope of this disclosure.

Another embodiment of the present invention, using the same VLC system as previously mentioned, can block the entire recording of copyrighted materials on the display device. The same image recognition software on the recording device will also prevent users from recording at the same event.

Detailed descriptions of embodiments of the claimed structures and methods are disclosed herein; however, it is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

Figure 1:
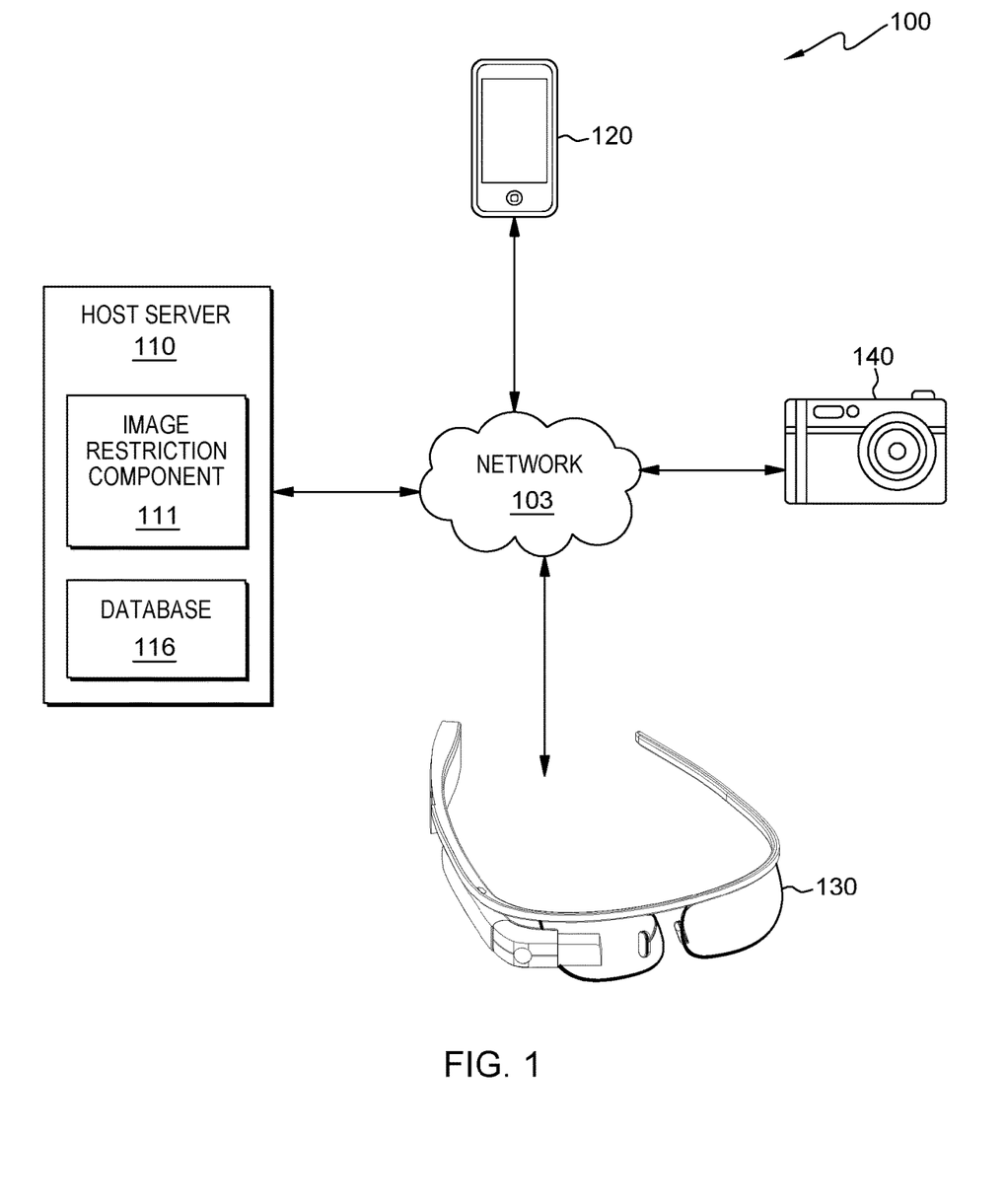
FIG. 1 is a functional block diagram illustrating the topology of the host server image security environment 100, in accordance with an embodiment of the present invention.

FIG. 1 is a functional block diagram illustrating the topology of the host server image security environment 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Host server image security environment 100 includes host server 110, mobile phone 120, smart glass 130 and digital camera 140, all interconnected over network 103. Network 103 can be, for example, a telecommunications network, a local area network (LAN), a wide area network (WAN), such as the Internet, or a combination of the three, and can include wired, wireless, or fiber optic connections. Network 103 can include one or more wired and/or wireless networks that are capable of receiving and transmitting data, voice, and/or video signals, including multimedia signals that include voice, data, and video information. In general, network 103 can be any combination of connections and protocols that can support communications between host server 110, mobile phone 120, smart glass 130, digital camera 140, and other computing devices (not shown) within host server image security environment 100.

Host server 110 can be a standalone computing device, a management server, a web server, a mobile computing device, or any other electronic device or computing system capable of receiving, sending, and processing data. In other embodiments, host server 110 can represent a server computing system utilizing multiple computers as a server system, such as in a cloud computing environment. In another embodiment, host server 110 can be a laptop computer, a tablet computer, a netbook computer, a personal computer (PC), a desktop computer, a personal digital assistant (PDA), a smart phone, or any other programmable electronic device capable of communicating with mobile phone 120, and other computing devices (not shown) within host server image security environment 100 via network 103. In another embodiment, host server 110 represents a computing system utilizing clustered computers and components (e.g., database server computers, application server computers, etc.) that act as a single pool of seamless resources when accessed within host server image security environment 100. Host server 110 includes image restriction component 111 and database 116.

Image restriction component 111 enables the present invention to manage recording of copyrighted materials on one or more devices. For example, referring to FIG. 1, image restriction component 111 can manage mobile phone 120, smart glass 130, and digital camera 140. In the depicted embodiment, image restriction component 111 resides on host server 110. In another embodiment, image restriction component 111 can reside on mobile phone 120, smart glass 130, and digital camera 140. In the depicted embodiment, image restriction component 111 consists of several components (refer to FIG. 2) such as detect signal component 112, shield component 113, decode signal component 114, and image processing component 115.

Database 116 is a repository for data used by image restriction component 111. In the depicted embodiment, database 116 resides on host server 110. In another embodiment, database 116 may reside elsewhere within host server image security environment 100, provided that image restriction component 111 has access to database 116. A database is an organized collection of data. Database 116 can be implemented with any type of storage device capable of storing data and configuration files that can be accessed and utilized by host server 110, such as a database server, a hard disk drive, or a flash memory. Database 116 uses one or more of a plurality of techniques known in the art to store a plurality of information. For example, database 116 may store information that is used by image restriction component 111 to match the pulse IR (infrared) signal to known IR patterns.

Mobile phone 120 is one or more telecommunication devices that has the ability to record audio and video signals. Generally, mobile phone 120 can be a standalone mobile computing device, or any other electronic device or computing system capable of recording, receiving, sending, and processing data.

Smart glass 130 is one or more display devices that has the ability to record audio and video signals. Generally, smart glass 130 can be a standalone computing device, a mobile computing device, or any other electronic device or computing system capable of displaying, recording, receiving, sending, and processing data.

Digital camera 140 is one or more devices that has the ability to record audio and video signals. Digital camera 140 can be a standalone recording device, or any other electronic recording device or computing system capable of recording, receiving, sending, and processing data.

Figure 2:
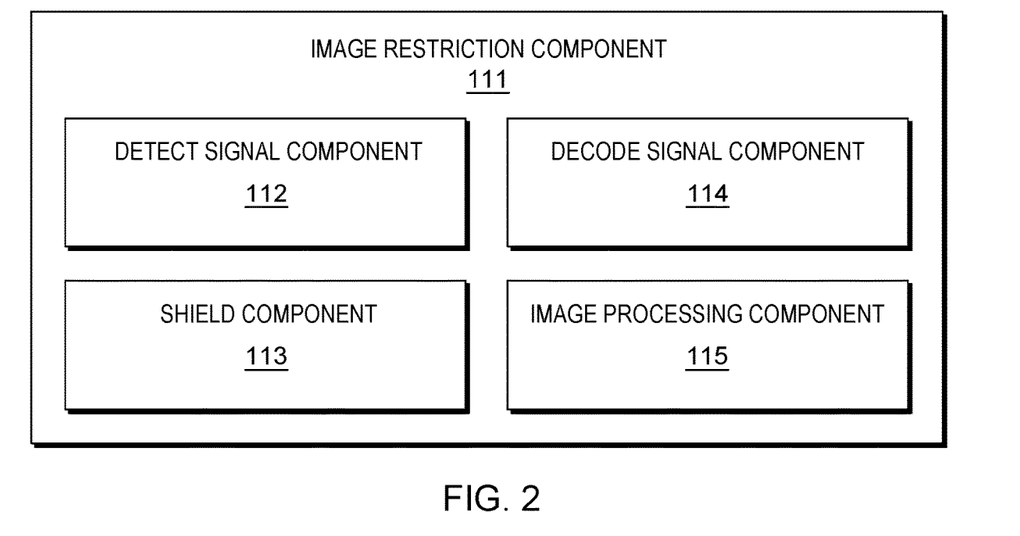
FIG. 2 is a functional block diagram illustrating the components of IR security component 111, in accordance with an embodiment of the present invention.

FIG. 2 is a functional block diagram illustrating the components of image restriction component 111, in accordance with an embodiment of the present invention. Image restriction component 111 includes detect signal component 112, shield component 113, decode signal component 114, and image processing component 115.

Detect signal component 112 of the present invention provides the capability of detecting signals emitted from the restricted materials protection system (i.e., VLC transmitter). It is noted that the terminology of "restricted materials protection system" can include two similar but distinct systems. For example, a restricted materials protection system can exist as a system to interfere with recording of restricted materials (i.e.,VLC system). At the same time, another restricted materials protection system can exist in the hardware of the recording device (i.e., encoded chip on a smartphone). In an embodiment, detect signal component 112 can detect and distinguish the different type of signals from the restricted materials protection system. For example, these signals can include VLC, IR and radio frequencies (e.g., WiFi, Bluetooth, LiFi, microwave, etc.). Furthermore, detect signal component 112 can search through database 116 to determine the type of data signal that was sent. In another embodiment, detect signal component 112 can determine the information of what material is restricted and the location of that material in the nearby space of the recording device. In addition to the spatial location of the restricted materials, a "buffer" zone, shape, and size of the restricted materials information may be transmitted by the VLC system. It is noted that the buffer zone may be user selectable percentage (i.e., add 110% of the surface area of the shape and the 10% is the buffer or any user selectable proportional to the shape).

Shield component 113 of the present invention provides the capability of syncing (or synchronizing) the detected signal (i.e., pulsed pattern image capture interference signal) pulse with the clock pulse of the digital recording device. In an embodiment, shield component 113 can sync the detected IR pulse to the shutter of the recording device (i.e., camera). The main reason to sync the shutter to the clock signal of the device is due to interference from the restricted material protection system (i.e.,VLC system). It was noted earlier that the VLC transmitter can transmit an encoded signal (e.g., infrared, radio-frequency, etc.) that can interfere with normal recording functionalities of the recording devices. Therefore, it is necessary for the shutter of the device to sync with the detected signal pulse in order to establish and resume recording capabilities. For example, the shutter of the camera will process the detected signal (i.e.,IR pattern) and close the shutter at the specific intervals when the IR is open. Therefore, the camera will not be "blinded" by the IR pulse (e.g., blurred, overexposed image, etc.). When the camera shutter is open, it will be able to record the room as normal. Any well-known method in the art can be used to sync/synchronize and eventually control the camera shutter to the pulse pattern image capture interference signal.

In another embodiment, shield component 113 syncs the detected interference signal with the internal image processing hardware of the recording device. For example, the VLC signal is a radio frequency signal (not IR) and it contains instructions only the hardware of the recording device can process/understand. The broadcasted signal interferes with the internal circuitry of the recording device, rendering it incapable of saving the recording to memory.

Decode signal component 114 of the present invention provides the capability of decoding the detected signal and translates into a series of commands for the restricted material protection system's processing (done by the hardware on the recording device). In an embodiment, decode signal component 114 in conjunction with detect signal component 112 can search the detected signal against a database (i.e., database 116) in order to determine various information such as, how to sync the camera shutter and how to process the restricted material by the hardware of the recording device (e.g., processor, memory, etc.).

Image processing component 115 of the present invention provides the capability of partial or fully restricting the recording of copyright materials. Essentially, image processing component 115 can send instructions to the hardware for the removing the restricted material (i.e., censor), using any well known techniques in the art, before storing into memory. In an embodiment, image processing component 115 through the internal hardware of the recording device can allow recording of a particular scene but partially block out copyrighted materials (see FIG. 5A-5C). For example, image processing component 115 may determine a portion of the restricted material to be censored/blocked based on the received the VLC signal and to modify the video recording to replace the portion of the restricted material to be censored with a graphical element adapted to obscure the portion of the identified restricted material in the video. For instance, the internal hardware of the recording device can generate the graphical element such that it is representative of a simplified 3D model of the identified restricted materials. Identified restricted material may be replaced by simple 3D models, such as cubes, prisms or boxes that obfuscate the shape and/or details of the restricted materials. The simplified models may have flat or smoothed surfaces and may be matt or opaque in color so as to mask or hide details in the modified video. Furthermore, the graphical element may include a masked or blurred version of the portion of the identified restricted material. Simple graphic or video processing and rendering techniques may therefore be used in order to censor private objects/items in a modified video according to an embodiment.

In another embodiment, image processing component 115 through the internal hardware of the recording device can allow the entire recording of copyrighted materials assuming the device contains the correct and legal software installed. It is noted that pulse pattern image capture interference signal that has not been synchronize by shield component 113 can still interfere with image recording with the screen of the recording device and/or during playback by showing a blurred image due to the blinding effect of the IR signal.

Figure 3:
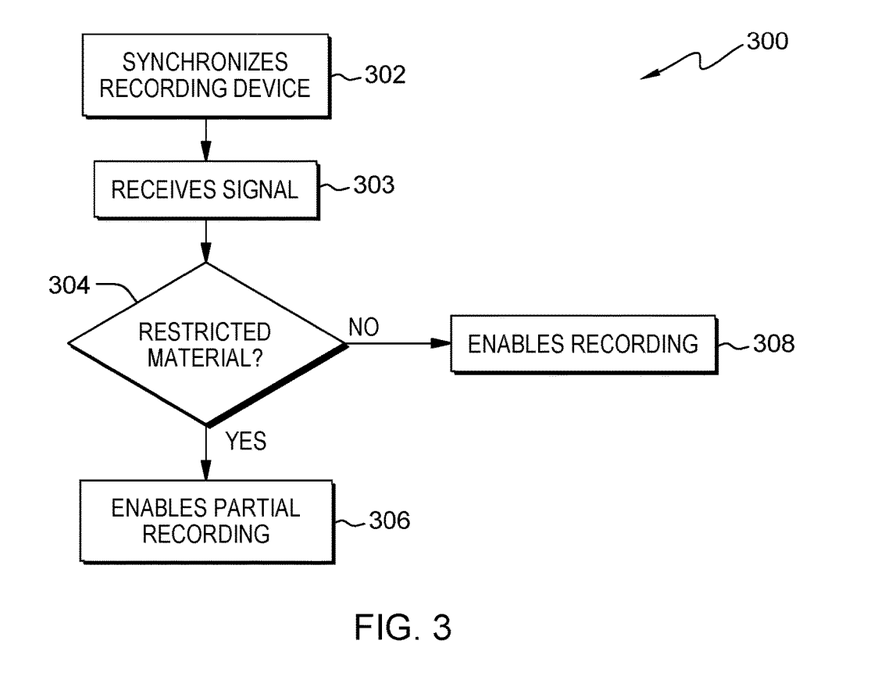
FIG. 3 is a flowchart, designated as 300, depicting operational steps of method for executing the host server image security environment 100, in accordance with an embodiment of the present invention.

FIG. 3 is a flowchart, designated as 300, depicting operational steps of method for executing the host server image security environment 100, in accordance with an embodiment of the present invention.

Image restriction component 111 synchronizes with the recording device (step 302). In an embodiment, image restriction component 111 through shield component 113 syncs the received pulse pattern image capture interference signal to the hardware of the recording device.

Image restriction component 111 receives one or more data signals (step 303). In an embodiment, image restriction component 111 through detect signal component 112 receives data signals (e.g., pulsed pattern image capture interference signal, location of restricted materials) from one or more transmitters located near one or more copyrighted materials. The transmitter can utilized IR (e.g., VLC) or radio frequency (e.g., Wi-Fi, Bluetooth, etc.) to communicate to the nearby recording devices.

Information carried by the data signal (i.e., location of restricted materials) can contain information such as the spatial location of restricted materials. For example, the screen at the movie theater showing copyrighted material can send X and Y coordinates of the restriction via the IR pulsed signal.

Other information carried by the data signal (i.e., pulsed pattern image capture interference signal) can contain IR pulsed that can interfere with recording of images by a recording devices. For example, IR pulsed can cause overexposed, underexposed or blurred images on the recording device chip (i.e., CCD sensor, CMOS sensor). It is noted that the frequency of the pulsed pattern image capture interference signals can be random and intermittent.

Image restriction component 111 determines whether there are restricted material nearby (decision block 304). In an embodiment, image restriction component 111 through detect signal component 112 determines whether there are nearby copyrighted materials. If there are nearby copyrighted materials then image restriction component 111 proceeds to enable partial recording (step 306) ("YES" branch, decision block 304). If there are no copyrighted materials nearby then image restriction component 111 proceeds disable recording (step 308) ("NO" branch, decision block 304).

Image restriction component 111 enables partial recording (step 306). In an embodiment, image restriction component 111 through decode signal component 114 processes the live images. The data signal sent by the transmitter of the copyrighted material (i.e., VLC transmitter) contains information on how fast and long to open the shutter of the recording device. For example, decode signal component 114 instructs the camera shutter to only open when the IR signal is dormant, so that it does not interfere with the images captured and forcing the shutter speed so that image (e.g., frame for video) is captured before the IR signal returns. Furthermore, image processing component 115 can instruct the hardware of the recording device to remove the restricted material from storage in memory (e.g., memory card, hard drive, etc.).

Image restriction component 111 enables recording (step 308). In an embodiment, image restriction component 111 allows full recording of the scene or event since there are no copyrighted materials nearby and there are no active RMPS at the venue.

Figure 4A:
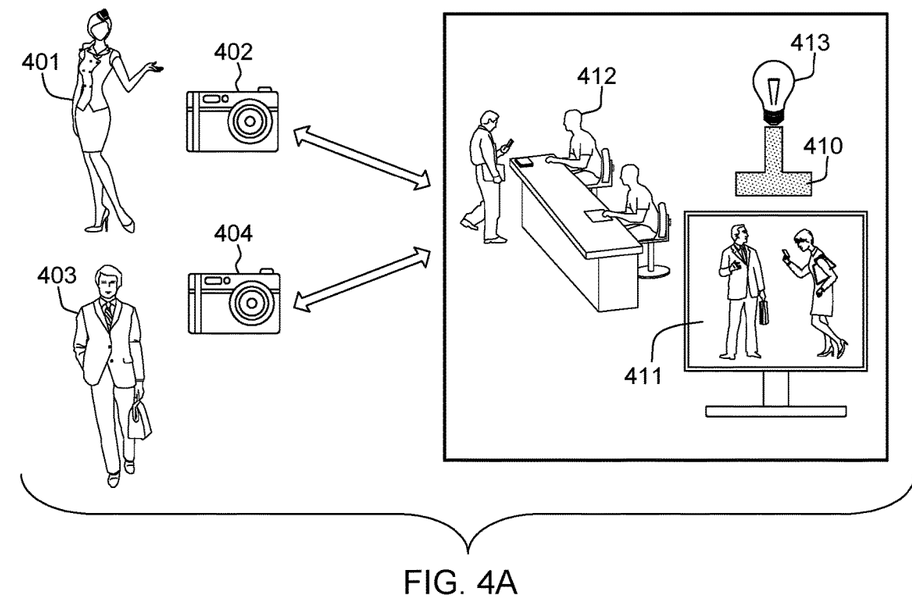
FIG. 4A illustrates live recording of a lecture by two cameras in the same location as protected copyright materials, in accordance with an embodiment of the present invention.

FIG. 4A illustrates live recording people in the same location as protected restricted materials, in accordance with an embodiment of the present invention. In a given scenario (FIG. 4A), two users (e.g., user A 401 and user B 403) are attending a lecture. In the lecture, presenter/lecturer 412 is seated next to video monitor 410 that is displaying restricted material 411. Furthermore, the copy protection system is in place around video monitor 410. Video monitor 410 includes VLC transmitter 413 which sends out IR random but continuous pulses to block recording devices. User A 401 and user B 403 would like to record the lecture using camera A 402 and camera B 404, respectively. User A 401 downloads and installs the software of the present invention (i.e., image restriction component 111) to camera A 402. However, user B 403 does not download or install the software on camera B 404. Both users (e.g., user A 401 and user B 403) uses camera A 402 and camera B 404, respectively, to record lecture from presenter/lecturer 412.

Figure 4B:
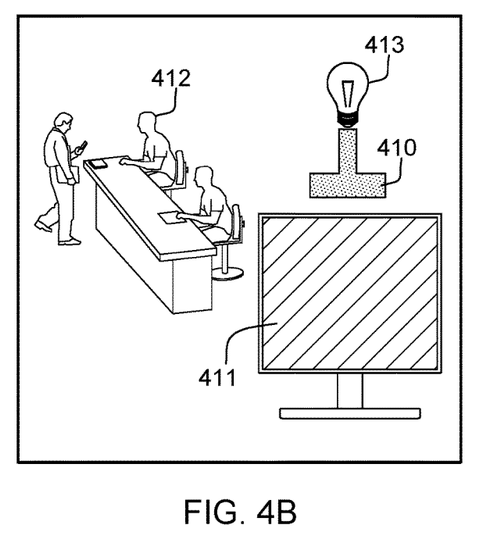
FIG. 4B illustrates the playback (from FIG. 4A) from a camera containing the software of the present invention.

FIG. 4B illustrates the playback (from FIG. 4A) of the recording of the lecture by presenter 412 in the same location as restricted material 411 by camera A 402, in accordance with an embodiment of the present invention. FIG. 4B represents the visual playback from camera A 402. It is noted that presenter/lecturer 412 shows up in the recording of camera A 402 but not restricted material 411.

Figure 4C:
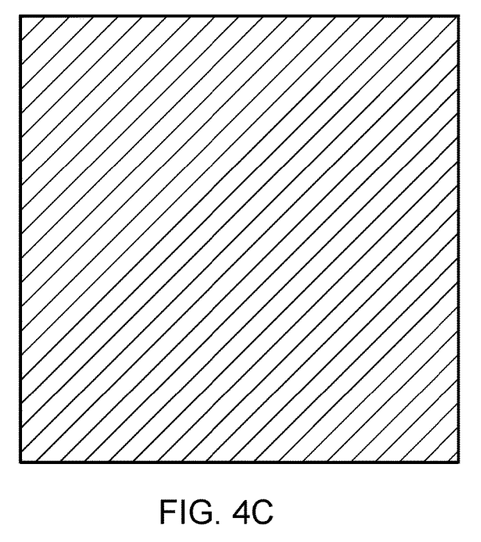
FIG. 4C illustrates the playback (from FIG. 4A) from a camera without the software of the present invention.

FIG. 4C illustrates the playback (from FIG. 4A) from camera B 404, in accordance with an embodiment of the present invention. Due to nearby restricted material 411, VLC transmitter 413 has interfered with the shutter of camera B 404. Therefore, camera B 404 was not able to record the lecture (which is not restricted).

Figure 5:
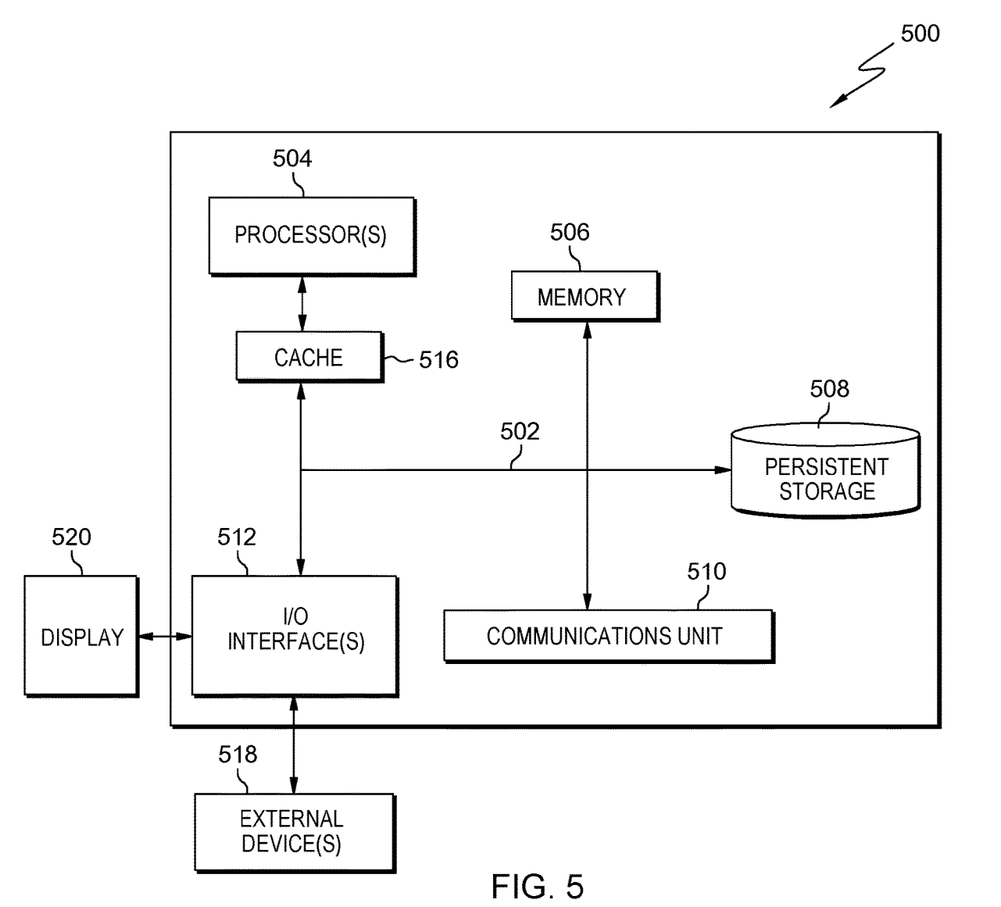
FIG. 5 depicts a block diagram, designated as 500, of components of the server computer executing the program within the host server, in accordance with an embodiment of the present invention.

FIG. 5 depicts a block diagram, designated as 500, of components of the server computer executing the program within the host server accelerator environment of FIG. 1, in accordance with an embodiment of the present invention.

Host server 110 can include processor(s) 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processor(s) 504 by holding recently accessed data, and data near recently accessed data, from memory 506.

Program instructions and data used to practice embodiments of the present invention, e.g., image restriction component 111 and database 116, can be stored in persistent storage 508 for execution and/or access by one or more of the respective processor(s) 504 of host server 110 via memory 506. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of smart glass 130. In these examples, communications unit 510 includes one or more network interface cards. Communications unit 510 may provide communications through the use of either or both physical and wireless communications links. Image restriction component 111 and database 116 may be downloaded to persistent storage 508 of host server 110 through communications unit 510.

I/O interface(s) 512 allows for input and output of data with other devices that may be connected to host server 110. For example, I/O interface(s) 512 may provide a connection to external device(s) 518 such as a keyboard, a keypad, a touch screen, a microphone, a digital camera, and/or some other suitable input device. External device(s) 518 can also include portable computer readable storage media such as, for example, thumb drives, portable optical or magnetic disks, and memory cards. Software and data used to practice embodiments of the present invention, e.g., image restriction component 111 and database 116 on host server 110, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor or the lenses of a head mounted display. Display 520 can also function as a touchscreen, such as a display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method of securing restricted materials from recording with a video recording device, the method comprising:
   synchronizing a recording device with a pulsed pattern image capture interference signal from a restricted materials protection system (RMPS), wherein synchronizing the record device comprises:
      decoding the pulsed pattern image capture interference signal; and
      controlling a shutter of the recording device based on the decoded pulsed pattern image capture interference signal, wherein the shutter opens and closes in synchronization with the pulsed pattern image interference signal;
   receiving a broadcast signal from the RMPS to enable image capture for a non-restricted portion;
   determining whether a recorded image contains a restricted portion; and
   responsive to determining that the recorded image contains the restricted portion, disabling the recording of the restricted portion.

2. The method of claim 1, further comprises:
   responsive to determining that the recorded image does not contain the restricted portion, enabling non-restricted recording.

3. The method of claim 1, further comprise:
   controlling recording capability of the video recording device based on the decoded pulsed pattern image capture interference signal, wherein the video recording device receives a command instructing the video recording device to disable recording.

4. The method of claim 1, wherein the pulsed pattern image capture interference signal further comprises at least one of an IR (infrared) signal, a microwave signal, a Bluetooth® signal, and a WiFi signal.

5. The method of claim 1, wherein the broadcast signal from the RMPS further comprises one or more spatial location coordinates associated with one or more restricted materials, a restricted zone shape, an associated size of the restricted zone shape and a buffer zone proportional to the restricted zone shape.

6. The method of claim 1, wherein the restricted materials protection system (RMPS) further comprises a VLC transmitter, a VLC receiver, an image recognition software and a dynamic image processing software.

7. A computer program product for securing restricted materials from recording with a video recording device, the computer program product comprising:
   one or more computer readable storage devices and program instructions stored on the one or more computer readable storage devices, the stored program instructions comprising:
      program instructions to synchronize a recording device with a pulsed pattern image capture interference signal from a restricted materials protection system (RMPS), wherein program instructions to synchronize the record device comprises:
         decoding the pulsed pattern image capture interference signal; and
         controlling a shutter of the recording device based on the decoded pulsed pattern image capture interference signal, wherein the shutter opens and closes in synchronization with the pulsed pattern image interference signal;

program instructions to receive a broadcast signal from the RMPS to enable image capture for a non-restricted portion;

program instructions to determine whether a recorded image contains a restricted portion; and responsive to determining that the recorded image contains the restricted portion, program instructions to disable the recording of the restricted.

8. The computer program product of claim 7, the stored program instructions further comprising:

responsive to determining that the recorded image does not contain the restricted portion, program instructions to enable non-restricted.

9. The computer program product of claim 7, the stored program instructions further comprise:

program instructions to control recording capability of the video recording device based on the decoded pulsed pattern image capture interference signal, wherein the video recording device receives a command instructing the video recording device to disable recording.

10. The computer program product of claim 7, wherein the broadcast signal from the RMPS further comprises one or more spatial location coordinates associated with one or more restricted materials, a restricted zone shape, an associated size of the restricted zone shape and a buffer zone proportional to the restricted zone shape.

11. The computer program product of claim 7, wherein the restricted materials protection system (RMPS) further comprises a VLC transmitter, a VLC receiver, an image recognition software and a dynamic image processing software.

12. The computer program product of claim 7, wherein the pulsed pattern image capture interference signal further comprises at least one of an IR (infrared) signal, a microwave signal, a Bluetooth® signal, and a WiFi signal.

13. A computer system for securing restricted materials from recording with a video recording device, the computer system comprising:

one or more computer processors;

one or more computer readable storage devices;

program instructions stored on the one or more computer readable storage devices for execution by at least one of the one or more computer processors, the stored program instructions comprising:

program instructions to synchronize a recording device with a pulsed pattern image capture interference signal from a restricted materials protection system (RMPS, wherein program instructions to synchronize the record device comprises:

decoding the pulsed pattern image capture interference signal; and controlling a shutter of the recording device based on the decoded pulsed pattern image capture interference signal, wherein the shutter opens and closes in synchronization with the pulsed pattern image interference signal;

program instructions to receive a broadcast signal from the RMPS to enable image capture for a non-restricted portion;

program instructions to determine whether a recorded image contains a restricted portion wherein the restricted portion comprise of a spatial location, buffer zone, shape and size; and responsive to determining that the recorded image contains the restricted portion, program instructions to disable the recording of the restricted portion.

14. The computer system of claim 13, the stored program instructions further comprising:

responsive to determining that the recorded image does not contain the restricted portion, program instructions to enable non-restricted.

15. The computer system of claim 13, the stored program instructions further comprise:

program instructions to control recording capability of the video recording device based on the decoded pulsed pattern image capture interference signal, wherein the video recording device receives a command instructing the video recording device to disable recording.

16. The computer system of claim 13, wherein the broadcast signal from the RMPS further comprises one or more spatial location coordinates associated with one or more restricted materials, a restricted zone shape, an associated size of the restricted zone shape and a buffer zone proportional to the restricted zone shape.

17. The computer system of claim 13, wherein the restricted materials protection system (RMPS) further comprises a VLC transmitter, a VLC receiver, an image recognition software and a dynamic image processing software.

\* \* \* \* \*